Patented Apr. 9, 1935

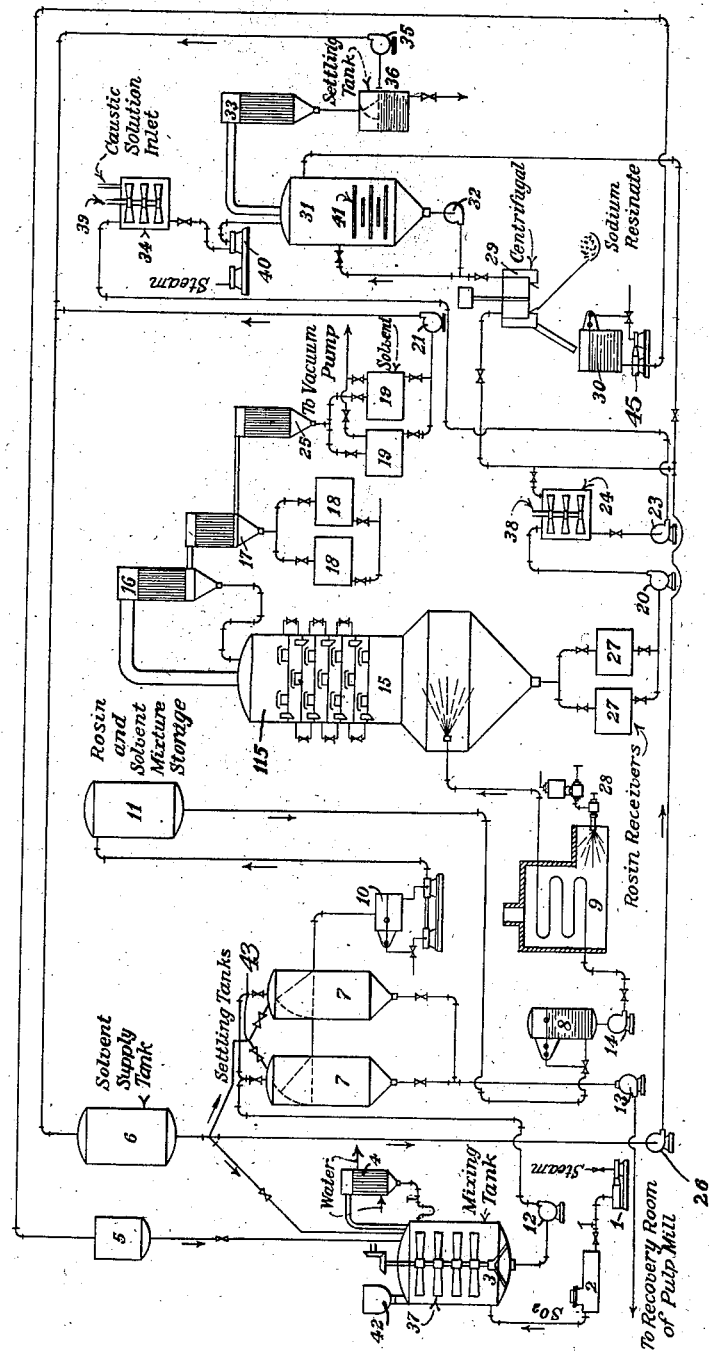

1,997,171

UNITED STATES PATENT OFFICE 1,997,171

PRODUCTION OF PURE BY-PRODUCTS FROM RESIN-CONTAINING LIQUORS

Edward H. French, Columbus, Ohio

Application March 12, 1932, Serial No. 598,351

18 Claims. (Cl. 202—64)

The invention relates to the production of highly purified rosin and resinous by-products from low-grade sources, and more particularly it concerns a process for the separate recovery of crystallizable rosin and rosin salts of high purity, and also relatively pure mixture of fatty acids and oily substances, from certain raw materials such as the waste liquors produced in the sulphate and soda processes of wood pulp manufacture.

The present invention is in part a continuation of my co-pending application serial #310,111, filed October 3rd, 1928 for Method of purifying resins.

During the pulping of wood by alkaline pulping processes, the cellulose of the wood is separated from the other substances such as ligneous matter, resins and various organic decomposition products, water and chemicals which together are designated "black liquor". Accompanying the resins in the "black liquor" there are varying amounts of various oxygen-containing organic compounds such as fatty acids or oily substances, and possibly others of an alcoholic nature such as pine oil, which are derived from the wood in the chemical digestion thereof. The amounts of these compounds present in the wood varies considerably, depending upon such factors as the species and age of the tree, the part of the tree from which the wood is obtained, the soil, etc.

In the alkaline pulping processes, the resins and oily substances are believed to occur in the form of water soluble salts or soaps. These may then be decomposed by treatment with a mineral acid, or by means of a suitable acid gas as disclosed in my Patents #1,693,586 and #1,810,472. The rosin and said oxygen-containing compounds thus released are then dissolved in a suitable solvent therefor, such as gasoline, kerosene, naphtha, or gas oil.

According to the invention described in my copending application #172,821, filed March 4, 1927, and in prior applications, a solution of rosin in a volatile solvent is distilled under high vacuum at temperatures below 275° C.,—preferably by a flash-vaporizing process,—whereby rosin is distilled overhead in the presence of a substantial portion of the solvent, and the rosin is recovered practically undecomposed. After its condensation in well-known manner,—either in the presence of the solvent or separately therefrom,— the purified rosin is treated in manner to produce a neutral water soluble resinate which is of a grade highly satisfactory for use in the soap industry and others. However, when the crude rosin, from which the solution to be thus treated was formed, had been secured from certain sources and contained an unusually high percentage of the oily substances or fatty acids, the final products were extremely difficult to obtain in pure form.

I have now discovered that the solvents used possess the property under certain conditions of extracting from mixtures containing rosin and other oxygen-containing compounds and decomposition products,—such as crude "black liquor" and concentrates associated therewith,—not only the rosin content thereof but also various coloring and odor-producing bodies, which renders the mixture cloudy and which subsequently must be removed prior to distillation of the mixture in order to render the rosin produced fully satisfactory for many purposes, as for instance, the manufacture of neutral sodium resinate and high grade rosin. Moreover, I have determined experimentally that in the distillation of such a solution of rosin,—if the concentration of the rosin in solution is too high,—then upon the distillation overhead of such concentrated solution under high vacuum temperatures below 275° C., in the manner indicated in my Patent #1,810,472,—the final distilled product or rosin-fatty acid mixture frequently will have an objectionable burned wood odor. Furthermore, when such distilled rosin is treated in the manner described in my copending application Serial No. 172,821, for the manufacture therefrom of sodium resinate, there is at times a notable tendency for certain objectionable impurities to precipitate out with the resinate upon removal of the water.

I have now discovered that these objectionable coloring and odor-producing bodies can be eliminated by diluting the solution of rosin prior to the distillation with sufficient of the solvent to reduce the rosin concentration to a point where the aforementioned impurities will precipitate out when the solution is cool. While the proportion of these impurities which precipitate upon cooling depends somewhat upon the degree of dilution with the solvent, I have found that usually all of such impurities are removed when a concentration of approximately 1 part by weight of rosin or rosin-fatty acid mixture to 6 or more parts of solvent is employed.

The brownish-black mass of impurities thus precipitated upon diluting the cool solution of rosin sinks to the bottom of the containing vessel upon settling,—or to the water line if water is present, and the clear solution of rosin, solvent, and fatty substances may be decanted, filtered, or otherwise separated from the impurities.

While the composition of the removed impurities is not known, they are believed to be in the nature of glucosides.

According to the present invention, while the concentration of the rosin or total rosin-fatty substance mixture present in the solution being distilled is preferably adjusted in the ratio of 1 part by weight of the former to 5 or 6 parts of the solvent,—greater dilutions may be less economically employed. The rosin obtained by distilling the resultant solution after removal of the precipitate, is free from objectionable odor and light in color.

The fatty materials and other oxygen-containing organic compounds which accompany the impure rosin, especially when obtained from such source as alkaline pulping liquors and concentrates therefrom,—and which are probably largely mixtures of oleic and linoleic acids, and may contain in certain instances pine oil and other oily substances of an alcoholic nature,—tend when present to distill with the rosin and,—when in substantial amounts in the rosin solution,—render the solution generally unsuitable for resinate manufacture. In some instances their presence prevents the precipitation of granular resinates or crystals. Particularly is this true where the fatty or oily substances are present in amounts equal to or greater than the rosin. Moreover, when such a mixture of rosin, fatty acids and oily substances are distilled under vacuum by the methods in use prior to my invention, sufficient decomposition of either the rosin or fatty acids or both occurs to form products, the presence of which in the mixture in the amount formed prevent crystallization of the rosin, when it is desired to produce it instead of the resinate. Neither the rosin nor the fatty substances thus obtained can have a high commercial value because of the presence of the other.

Applicant has discovered that these fatty or oily substances and other such oxygen-containing compounds may be effectively separated from the rosin and recovered, so as concurrently to render the rosin crystallization practicable while recovering a valuable product having many commercial uses. This is preferably accomplished in connection with the step of distilling under high vacuum the solution of rosin and the said substances, under conditions inhibiting their decomposition and that of the rosin,—the latter remaining behind as a still product. A high grade of mixed oily substances or fatty acids is thus produced, employing a high vacuum distillation, preferably using a form of flesh-vaporization hereinafter more specifically described,—at high temperatures but below the normal distillation point of the rosin. The distillation of the fatty or oily substances may if desired be carried out under high vacuum alone and without flash-vaporizing the mixture. When kerosene is employed as the solvent, the fatty acid fraction distills over between 180° and 250° C., under a vacuum of 28-29 inches of mercury. The fatty or oily substances are then condensed either in the presence of the solvent or separate therefrom, and are recovered. The rosin remaining in the still is suitable for use in making crystallizable rosin,—or it may be used for making resinates such as described in my copending application Serial No. 172,821 without further distillation for purifying purposes.

According to another modification of the invention, the solution of rosin and the said oxygen-containing substances is distilled under high vacuum, preferably by means of a flash-vaporizing process described above, at temperatures below 275° C.,—and preferably around 250–260° C., when using a vacuum of 28-29 inches of mercury. The distillation is so performed that the mixture of rosin, oxygen-containing substances including fatty acids, and the organic solvent distill overhead. The rosin and fatty acids are condensed in the presence of a part at least of the organic solvent. The condensate is then concentrated and cooled as necessary, whereupon the rosin crystallizes out, leaving the fatty acids and other oxygen-containing substances behind in the solvent. Under the distillation conditions named, substantially no rosin decomposition occurs. In the event that there is a sufficient amount of the fatty acids and other oxygen-containing substances, liquid at normal temperatures, present to serve both as a rosin solvent and to so reduce the distillation temperature under the conditions named as to prevent decomposition during distillation,—the amount of solvent to be added to dissolve the rosin can be correspondingly reduced. In fact, if a sufficient amount of such oxygen-containing substance is present or added, no additional rosin solvent need be used.

When it is desired to convert the fatty acid-free rosin to sodium resinate, after the removal of the distillable fatty substances and the like therefrom, the rosin is dissolved in a solvent such as kerosene or gasoline, preferably in amount such as to give a solution containing around one part by weight of rosin to two or more parts of the solvent. The rosin in this solution is then reacted at suitable temperatures, preferably around the boiling point of water, with a dilute aqueous caustic soda solution or its equivalent,—the caustic alkali being present in amount sufficient to neutralize about 70% of the rosin. A clear solution containing these substances is thereby produced, which is well adapted to insure intimate contact of the reactive agents. The said solution,—which under some conditions may exist as an emulsion,—is then heated to vaporize the water and a portion of the solvent,—the latter of which in major part at least is replaced continuously or intermittently to avoid the development of too great a concentration of rosin in the solvent. As soon as the water is distilled substantially completely away, precipitation of the sodium resinate occurs in the form of crystals or granules in amount depending upon such factors as the concentration of reactants and the degree to which the oily and fatty substances and impurities previously have been eliminated from the rosin. Under the conditions named above, approximately 50% of the neutral resinate precipitates upon cooling to around room temperature,—the balance remaining in the mother liquor which still contains some rosin in solution, from which the precipitated resinate is filtered. The latter is then washed with a suitable liquid such as clean rosin solvent, and the excess solvent is then removed as by centrifuging or the like.

The resultant neutral resinate appears to be a new product heretofore unknown. It is predominately crystalline, consisting of acicular crystals showing parallel extension and moderate birefringence, sign of elongation (—), index of high ray equals 1.57 plus, crystal probably orthorhombic. The crystals are small, five times as long as their width. The width of the crystals ordinarily is about five microns (.005 mm.).

The material consists of a matted aggregate of these tiny crystals apparently free from other crystalline substances.

Prior to the present invention, when sodium resinate was precipitated in the manner hereinbefore described, it has been impossible to precipitate or crystallize all of the residual resinate in the mother liquor by the simple addition to the hot liquor of additional caustic alkali in aqueous solution, even by alternately heating and cooling, because of the fact that the boiling point of the water present in the alkaline solution is so much lower than that of the rosin-resinate-solvent of the mother liquor that an immediate and violent boil-over of the still occurs. It therefore has been necessary to further concentrate the mother liquor and then to rapidly cool it down to precipitate additional resinate therefrom.

Applicant has discovered that this additional work and expense can be avoided by adding to the mother liquor without cooling it, a solution prepared by adding to an unheated or heated solution of rosin in a rosin solvent such as kerosene a dilute aqueous solution of caustic alkali or its equivalent in amount sufficient to neutralize from 80% to 100% of the rosin present in the solution, water being present in amount such as to produce an emulsion or colloidal solution containing the rosin, alkali, water, and rosin solvent. In one run this emulsion contained 190 parts by weight of water, about 26 parts of NaOH, 193 parts of rosin, and (800 X sp. gr.) parts of kerosene. Smaller proportions of water tend to produce a less stable emulsion requiring agitation. This colloidal solution or emulsion, either heated or unheated, is flowed, preferably in fine streams, into the hot mother liquor, or into a hot solution of rosin in a rosin solvent, maintained at a temperature well above the normal boiling point of water, and—when kerosene is the solvent,—at temperatures around 190° to 200° C. As the emulsion strikes the highly heated kerosene, the water present is very quickly evaporated at the surface of the liquid, and is removed by suitable apparatus, thus insuring the absence from the body of hot solution of sufficient water to cause the formation of a jelly or grease such as is normally formed by mixtures of water, alkali, rosin, and solvent when there is present an insufficient amount of free rosin to prevent it. As a result of the constant addition of the above-described solution to the body of mother liquor or rosin solution, there is a continuous precipitation from the latter of the desired neutral resinate. After the vessel containing the treated mother liquor contains sufficient sodium resinate and the mixture is of a thick consistency, the latter is withdrawn and is filtered while hot in a filter press or centrifuge, and is then washed with clean solvent and dried.

It will therefore be recognized by those skilled in the art that by distilling the fatty compounds and other oxygen-containing compounds from the rosin, and the removal therefrom of certain coloring and odor-producing materials, applicant has succeeded both in rendering dark, low grade rosin and rosin residues sufficiently free from these substances to permit the production of crystallizable rosin and high grade resinates from certain raw materials not otherwise adapted for the purpose, while simultaneously recovering these valuable oily substances, fatty acids, and the like in a form suitable for many uses, particularly in the soap industry.

The accompanying drawing illustrates diagrammatically apparatus adapted for the practice of the present invention. Referring more particularly to the drawing, "black liquor", or the concentrated soap or resinous mass skimmed from such "black liquor",—or other rosin-bearing material containing oily or fatty substances and rosin in the presence of an alkaline solution,—is fed into the mixing tank 3, through the inlet valve of hopper 42. To this material in tank 3 is added a suitable volume of a rosin solvent such as kerosene, naphtha, gasoline, or the like, from either the solvent tank 5 or the tank 6. Within the mixing tank 3 the mixture of rosin-containing substance and solvent is treated with an acid, preferably by the continuous passage therethrough of an acid or acid substance in gaseous form, such as $SO_2$ or the waste gases from a black ash furnace,—although sulphuric or other mineral acid, or an acid salt such as nitre cake, may be employed.

In the form of the invention shown, sulphur dioxide is produced in a sulphur burner 2, the latter of which is supplied with air by the pump 1. The rosin and certain organic acids and oily substances when present, are dissolved in the solvent as rapidly as liberated by the acid or acid gas. The tank 3 is provided with agitating means 37. As the treatment with hot acid gas proceeds, the mass is heated to a point promoting the release of the rosin and oily and fatty substances. In the event that a mineral acid or a cold acid gas is used, the mixing tank 3 is provided with a heating coil for maintaining a suitable temperature facilitating the rosin releasing reaction.

The tank 3 is provided with a reflux condenser 4, which is so operated that any solvent volatilized or mechanically carried out of the mass by the acid gases being withdrawn, is condensed and returned to the still.

As already indicated, the solvent employed is preferably a hydrocarbon such as gasoline or kerosene, and is added in such amounts as to provide a ratio of total rosin and oily or fatty substances to solvent of from one part by weight of the former to 5 or more parts of the solvent.

The acid-treated mixture is then forced by pump 12 either directly to the settling tanks 7 or indirectly thereto through a filter (not shown). The mixture is then permitted to settle in the tanks 7, whereupon it separates into three layers; i. e. (a) a lower aqueous layer containing the water soluble salts resulting from the black liquor treatment, and which may be returned by the pump 13 to the recovery room of the pulp mill; (b) a middle layer containing some water and solvent and certain bodies insoluble in the cold dilute rosin solution as well as in the lower aqueous layer. This middle layer may be filtered to recover any solvent and rosin therein. The filtrate is allowed to stand and a water layer which forms is separated and returned to the recovery room of the pulp mill to recover sodium salts therefrom. A solvent layer which likewise forms is added to the layer (c) herebelow described. The insoluble material (nigger) upon the filter is fed to the black ash furnace of the mill. A top layer (c) which contains a solution of rosin, fatty substances and other oxygen-containing compounds, in a rosin solvent. This top layer yields a clear solution when the acid-treated mixture has been suitably diluted and the precipitate therefrom settled, as hereinbefore described. This dilution may be effected by flowing additional solvent into the material in tank 7 from the solvent supply tank 6 through the valve-controlled lines 43.

The solution forming the top layer is then forced by pump 10 to the storage tank 11, from which it is fed as needed to a regulator tank 8. From the latter the pump 14 forces it under pressure into a preheater, shown diagrammatically at 9, wherein it is heated while under pressure to a temperature between 175° and 250° C., depending upon such factors as the amount of solvent present, the boiling point of the solvent, and the degree of vacuum under which the subsequent distillation is to be effected.

The preheated rosin solution is then sprayed or otherwise finely dispersed into the vacuum still 15, which is provided with a bubble-plate column or dephlegmator 115, in which the pressure upon the solution is suddenly released, while maintaining the said temperature. The temperature and degree of vacuum are maintained such that, under the influence of the partial pressure effect of the solvent, the oily or fatty substances are vaporized and flow overhead from the upper part of the column to the primary condenser 16, while the rosin is unvaporized and remains behind as a still product.

Any condensate formed in condenser 16 is refluxed and returned to the still 15. The uncondensed vapors flow to condenser 17, the latter of which is maintained at a temperature adapted to condense the oily and fatty materials present in the vapors. The condensate is recovered in the receivers 18.

The more volatile solvent vapors then flow to condenser 25, and are there condensed and passed to receivers 19, from whence pump 21 returns them to the solvent tank 6.

A vacuum preferably of 27 or more inches of mercury is maintained upon the still,—induced by suitable means not shown.

When it is desired to produce a high grade crystallizable rosin from the dark resinous still residue in still 15, it is flowed in molten form or in solution from the receivers 27 by means of the pump 20 into the tank 24 where a rosin solution is prepared containing 1 or more parts by weight of solvent to each part of rosin. The rosin solution may then be flash-distilled in a still such as the still 15, at a temperature between 240° and 275° C. and under high vacuum of around 4 mm. of mercury, as described in my Patent #1,693,586,—the rosin and solvent being distilled overhead and the former condenser in the presence of a portion at least of the solvent, from which it is subsequently crystallized upon suitable concentration and cooling of the distillate.

If the said dark still residue is to be used for the manufacture of my neutral water soluble resinate, the former is forced in fluid or molten form from receivers 27 by pump 20 into mixing tank 24 having agitating means 38. In the tank 24 the impure rosin is dissolved in rosin solvent which may be drawn from tank 6 by pump 26. The resultant rosin solution, preferably containing 1 part by weight of rosin to at least 2 parts of solvent, is then forced by pump 23 to tank 34 where it is treated and agitated with an aqueous solution of caustic alkali, as previously described.

The resultant colloidal solution or emulsion, either in cold or heated condition, is then introduced by pump 40 into the body of hot liquid in the still 31 through spray nozzles. The said body of solvent is fed to the still by pump 26; and the still is heated, as by steam coils 41. The still may be provided with agitating means. In the form shown the materials in the still are agitated by rapid circulation of the same within the still by means of recirculating pump 32 and interconnecting valve-controlled lines. The water and any solvent distilled away during this treatment are condensed in 33, and the condensed solvent is separated from the water in separator 36, the solvent being conducted to storage tank 6, under action of the pump 35.

Precipitated sodium resinate is withdrawn periodically or continuously from the still 31 under the influence of pump 32, and is fed to the centrifuge 29, where it is whizzed and washed with fresh rosin solvent fed thereto by pump 26. The solvent thus extracted flows to solvent tank 30, from which it is returned to the solvent tank 5 for reuse through float-controlled pump 45. The thus-purified resinate is withdrawn from the resinate in well-known manner, and if desired may be further washed or treated to remove traces of the said rosin solvent or solvent odors.

It will be understood by those skilled in the art that when the raw materials from which the highly purified rosin is to be recovered contains rosin in its free form as such, in the absence of alkali resinates, and with or without the presence therewith of fatty or oily compounds and other oxygen-containing substances, the step of mixing and pretreating such raw materials with an acid or acid gas hereinbefore mentioned may be omitted, and the rosin is dissolved directly in a rosin solvent and is treated from that point in accordance with the steps herein set forth. It is likewise to be understood that the rosin solution produced in the mixing vessel 24 may be used for the production of a highly purified rosin instead of for the manufacture of sodium resinate. The mixture of fatty substances and other oxygen-containing organic compounds recovered in the receivers 18 may, if desired, be refined by suitable treatment such as by redistillation in high vacuum at temperatures below their decomposition temperatures, and if desired, in the presence of a stream of a volatile solvent therefor for the purpose of taking the advantage of the partial pressure effect of the latter.

While certain organic solvents have been specifically mentioned in the case, it is to be understood that the invention is in nowise limited to the use of such solvents. On the contrary, any rosin solvent is suitable for use, providing that it is liquid at normal atmospheric temperatures,—that it is substantially insoluble in water,—and that it has a vapor pressure higher than that of rosin. Such solvents as the various water-insoluble higher aliphatic alcohols, chloroform, carbon disulphide, ethers, monochlorbenzol and other chlorinated hydrocarbons and esters such as ethyl acetate, and oleic acid, or mixtures thereof may be employed.

The invention is susceptible of modification within the scope of the appended claims.

1. The process of recovering rosin from alkaline liquors containing resinates, which comprises the step of passing an acid gas through the said liquor in the presence of a volatile water-insoluble rosin solvent, thereby concurrently liberating and dissolving at least part of the rosin content of the said liquor.

2. The process as defined in claim 1 in which the said acid gas comprises a sulphur dioxide-containing gas.

3. In the process of recovering rosin from alkaline pulping liquors containing resinates, the step of passing therethrough a sulphur dioxide-containing acid gas in amount sufficient to neutralize at least a part of the resinates contained therein to form rosin, while concurrently maintaining in the reaction mixture a volatile water-insoluble rosin solvent in amount sufficient to dissolve the rosin thus formed.

4. The process as defined in claim 3 together with the steps of adjusting the concentration of rosin in the solvent to 1 part by weight of the former to 5 or more parts of the solvent, separating the rosin solution from any precipitate thus formed, and distilling the rosin solution under high vacuum at a temperature below that at which substantial decomposition of the rosin occurs.

5. The process as defined in claim 3, including the further steps of adjusting the concentrations of rosin and solvent to 1 part of the rosin in 5 or more parts of the solvent, separating the rosin solution from any precipitate thus formed, preheating the solution under pressure to a temperature at which under atmospheric pressure fatty acids present in the solution are vaporizable but the rosin is not vaporizable, flash-vaporizing the preheated solution under a vacuumized receptacle, distilling overhead the fatty acid components, and condensing and collecting the same, and separately recovering the residual rosin.

6. The process of recovering rosin from alkaline liquors containing resinates, which comprises passing therethrough a sulphur dioxide-containing acid gas in amount sufficient to neutralize at least a part of the resinates contained therein to form rosin, while concurrently maintaining the resultant reaction mixture in a water-insoluble rosin solvent in amount by weight 5 or more times that of the rosin dissolved therein, separating the rosin solution from any precipitated matter thus formed, and recovering the rosin from the said solution.

7. The process of purifying crude mixtures containing rosin and fatty acids, which comprises the step of distilling a solution of the said mixture in a volatile water-insoluble solvent under high vacuum at temperatures adapted to remove the fatty acids overhead substantially undecomposed while retaining the rosin in the form of a still product, separately condensing and recovering the fatty acids and solvent distilled overhead, and recovering the purified rosin.

8. The process as defined in claim 7 in which the said distillation is carried out at temperatures not higher than 260° C.

9. The process of purifying crude mixtures containing rosin and fatty acids, which comprises the steps of preheating a solution of the said mixture in a water-insoluble rosin solvent to from 175° to 250° C. under pressure, thereafter flash-vaporizing the resultant solution into a vacuumized receptacle maintained at a temperature adapted to affect distillation overhead of the fatty acids and solvent substantially undecomposed while below that at which the rosin is distilled over, separately condensing and recovering the fatty acids and the solvent, and recovering the rosin.

10. In the process of recovering rosin from alkaline pulping liquor containing resinates and fatty acid salts, the steps which include passing through the said liquor a sulphur dioxide-containing acid gas in amounts sufficient to neutralize a substantial portion of the resinates contained therein to form rosin and fatty acids, while concurrently maintaining in the reaction mixture a volatile water insoluble rosin solvent in amounts sufficient to dissolve the rosin and fatty acids formed, separating the resultant rosin and fatty acids solution from solid and fluid impurities present therewith, and distilling the rosin and fatty acid solution under high vacuum at a temperature adapted to remove overhead the fatty acids in substantially undecomposed form while retaining the rosin in the form of a still product, separately condensing and recovering the fatty acids and the solvent, and recovering the purified rosin.

11. The process of purifying distilled rosin containing fatty acids and derived from wood pulping liquor, which comprises crystallizing the distilled rosin from a solution thereof in a liquid having a higher vapor pressure than that of rosin, the said solution also having dissolved therein the said fatty acids, and separating the rosin from the solution of fatty acids.

12. The process of purifying crude mixtures containing rosin dissolved in fatty acids, which comprises distilling overhead under high vacuum the rosin and fatty acid content of a mixture containing rosin and sufficient fatty acids to dissolve the rosin and to substantially lower the distillation temperature thereof, condensing the rosin vapors in the presence of a portion at least of the said fatty acids, and crystallizing the rosin in the presence of the last-named portion of fatty acids.

13. The process of recovering rosin from alkaline liquors containing resinates and higher fatty acid salts, which comprises passing therethrough an acid gas in amount sufficient to neutralize at least a part of the resinates contained therein to form rosin and fatty acids while the said liquors have admixed therewith a water-insoluble rosin solvent, adjusting the amount of the said solvent to provide a mixture having one part of total rosin and fatty acids for each five or more parts of solvent, forming the said mixture into a plurality of layers including a layer of a solvent solution of rosin and fatty acids, separating the latter layer from the mixture and preheating the solution, spraying the preheated solution into a vacuumized receptacle thereby vaporizing the same, condensing the vaporized rosin and fatty acids in the presence of a quantity of the said solvent substantially less than the amount of total rosin and fatty acids condensed, and separating the rosin from the fatty acids and solvent.

14. The process of recovering rosin from alkaline liquor containing resinates and higher fatty acid salts, which comprises mixing the said liquor with a water-insoluble rosin solvent having a higher vapor pressure than that of rosin, passing an acid gas through the resultant mixture in amount sufficient to neutralize at least a part of the resinates contained therein to form rosin and fatty acids, adjusting the amount of the said solvent in the mixture to provide therein a ratio of one part of total rosin and fatty acids to at least 5 parts of the solvent, separating the mixture into a plurality of layers including one made up of a solvent solution of rosin and fatty acids, and separately recovering from the last-named solution the rosin and the fatty acids.

15. The process of purifying crude mixtures containing rosin and fatty acids, which comprises dissolving the rosin and fatty acids in a volatile water-insoluble rosin solvent having a higher vapor pressure than rosin, thereby forming a solution having at least five parts of solvent for each part of total rosin-fatty acid content, separating the solution into a plurality of layers including a layer consisting of a solution of rosin and fatty acids in the volatile rosin solvent, and a layer containing water, solvent, and some rosin, fatty acids, and bodies insoluble in both the solvent and in water, filtering the last-named layer, separating the water from the resultant filtrate, and separately recovering therefrom the rosin and the fatty acids.

16. The process of recovering rosin from alkaline liquors containing resinates and fatty acid salts, which comprises converting the resinates and fatty acid salts into rosin and fatty acids, distilling the rosin and fatty acids from the resultant mixture at temperatures not substantially above 275° C. and in the presence of a water-insoluble rosin solvent having a higher vapor pressure than rosin, and crystallizing the distilled rosin from a solution thereof in the said rosin solvent, thereby separating the rosin from the fatty acids and solvent, and separating the fatty acids from the solvent.

17. The process of recovering rosin from alkaline liquors containing resinates and fatty acid salts, which comprises converting the resinates and fatty acid salts into rosin and fatty acids, distilling at least the fatty acids from the resultant mixture under vacuum in the presence of a hydrocarbon having a higher vapor pressure than rosin, and at a temperature substantially below that at which decomposition of the rosin and fatty acids occurs, condensing and recovering the fatty acids, and recovering the rosin.

18. The process of recovering rosin from alkaline liquors containing resinates and fatty acid salts, which comprises converting the resinates and fatty acid salts into rosin and fatty acids, dissolving the same in a water-insoluble rosin solvent in the ratio of one part of total rosin and fatty acids to at least five parts of the solvent, stratifying the resultant mixture and separating therefrom a layer of a solution rich in rosin and fatty acids dissolved in the solvent, distilling at least the fatty acids and solvent from the said solution under vacuum at a temperature below that at which substantial decomposition of the rosin occurs, recovering the fatty acids and rosin, and crystallizing the latter from a solution thereof in a rosin solvent.

EDWARD H. FRENCH.